US011625545B2

(12) United States Patent
Pham et al.

(10) Patent No.: US 11,625,545 B2
(45) Date of Patent: *Apr. 11, 2023

(54) SYSTEMS AND METHODS FOR IMPROVED CONVERSATION TRANSLATION

(71) Applicant: Capital One Services, LLC, McLean, VA (US)

(72) Inventors: Vincent Pham, Champaign, IL (US); Jeremy Edward Goodsitt, Champaign, IL (US); Austin Walters, Savoy, IL (US); Fardin Abdi Taghi Abad, Seattle, WA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/186,504

(22) Filed: Feb. 26, 2021

(65) Prior Publication Data
US 2021/0182505 A1 Jun. 17, 2021

Related U.S. Application Data

(63) Continuation of application No. 16/752,862, filed on Jan. 27, 2020, now Pat. No. 10,970,494, which is a
(Continued)

(51) Int. Cl.
*G06F 40/58* (2020.01)
*G06F 40/51* (2020.01)
*G06F 40/274* (2020.01)

(52) U.S. Cl.
CPC ............ *G06F 40/58* (2020.01); *G06F 40/274* (2020.01); *G06F 40/51* (2020.01)

(58) Field of Classification Search
CPC ... G06F 17/289; G06F 17/276; G06F 17/2854
See application file for complete search history.

(56) References Cited

U.S. PATENT DOCUMENTS 8,990,064 B2* 3/2015 Marcu ................. G06F 17/289
704/10
9,152,622 B2* 10/2015 Marcu ................. G06F 17/2854
(Continued)

*Primary Examiner* — Mohammad K Islam
(74) *Attorney, Agent, or Firm* — Troutman Pepper Hamilton Sanders LLP; Christopher J. Forstner; John A. Morrissett

(57) ABSTRACT

Systems and methods for improved conversation translation are disclosed. The system receives a first portion of a conversation in a first language. The system translates the first portion of the conversation to a second language. The system generates a predicted second portion of the conversation. The first portion and the predicted second portion are sent to a second user device as a predictive translation. The system then receives an actual second portion of the conversation, translates it to the second language, and sends the first portion and the actual second portion to the second user device as a batch translation. The system compares the batch translation to the predictive translation to identity any differences and generates a color-coded translation highlighting any differences between the batch translation and the predictive translation. The system sends the color-coded translation to the second user device for display on the second user device.

20 Claims, 7 Drawing Sheets

Related U.S. Application Data continuation of application No. 16/529,950, filed on Aug. 2, 2019, now Pat. No. 10,635,754.

(56) References Cited

U.S. PATENT DOCUMENTS

| | | | |
|---|---|---|---|
| 9,842,101 B2* | 12/2017 | Wang | G06F 16/3322 |
| 10,417,349 B2* | 9/2019 | Lewis | G10L 15/265 |
| 2014/0229155 A1* | 8/2014 | Leydon | G06Q 30/0217 |
| | | | 704/2 |
| 2015/0254234 A1* | 9/2015 | Dixit | G06F 17/289 |
| | | | 704/2 |
| 2015/0370780 A1* | 12/2015 | Wang | G06F 16/3322 |
| | | | 704/9 |
| 2016/0179938 A1* | 6/2016 | Ghafourifar | G06F 21/6227 |
| | | | 707/609 |
| 2017/0322944 A1* | 11/2017 | Farr | G06F 16/958 |
| 2017/0337191 A1* | 11/2017 | Narayanan | G06F 17/271 |
| 2017/0351342 A1* | 12/2017 | Kandur Raja | G06F 3/0237 |
| 2018/0089173 A1* | 3/2018 | Prendergast | G06F 17/289 |

* cited by examiner

SYSTEMS AND METHODS FOR IMPROVED CONVERSATION TRANSLATION

CROSS REFERENCE TO RELATED APPLICATIONS

This application is a continuation of, and claims priority under 35 U.S.C. § 120 to, U.S. patent application Ser. No. 16/752,862, filed Jan. 27, 2020, which is a continuation of U.S. patent application Ser. No. 16/529,950, now U.S. Pat. No. 10,635,754, filed Aug. 2, 2019, the entire contents of each of which are fully incorporated herein by reference.

FIELD OF INVENTION

The present disclosure relates to systems and methods for the translation of conversations, and more particularly to systems and methods for improving conversation translation by reducing confusion and translation delay.

BACKGROUND

A conversation can be translated from one language to another language using various applications. Predictive translators and batch translators are two commonly used translators. Often, a conversation between two people needs to be performed in real-time; however, a lag time exists between the time a person utters a portion of a conversation and the time a translation is processed and outputted. To reduce lag time, many translators use predictive language translators, which predict the next few words of a conversation based on the last few words spoken. While predictive translators can help to reduce lag time, they are often imprecise because they are literally guessing what will come next in the conversation. As the name implies, batch translators translate the conversation in batches after the fact. As a result, batch translators are more precise—i.e., the errors are generally caused merely by the system "mis-hearing" the conversation, but suffer from lag time. Furthermore, both predictive translators and batch translators sometimes cannot properly determine language nuances, such as expressions, sentiments, and confusion.

Accordingly, there is a need for systems and methods for improved conversation translation. Embodiments of the present disclosure are directed to this and other considerations.

SUMMARY

Examples of the present disclosure comprise systems and methods for improved conversation translation. The method may include receiving, by a processor associated with a computing device, a first portion of a conversation in a first language from a first user device. The method may include translating the first portion of the conversation from the first language and to a second language. The processor may also generate a predicted second portion of the conversation based on the first portion and provide the predicted second portion in the second language. The processor may also send the first portion and the predicted second portion of the conversation as a predictive translation in the second language to a second user device. Further, the processor may receive an actual second portion of the conversation in the first language. The processor may send the first portion and the actual second portion of the conversation as a batch translation in the second language. The processor may also compare the predictive translation to the batch translation to identify any differences. The processor may then generate a color-coded translation that highlights the differences between the predictive translation and the batch translation. In some examples, the processor may then send the color-coded translation to the second user device to cause the second user device to display the predictive translation with any differences between the batch translation and the predictive translation highlighted in a first color. In other examples, the second user device can include a first GUI (GUI) to display the predicative translation and a second GUI to display the batch translation at the same time. The differences between the translations can be displayed in one or both GUIs with differences highlighted in various colors depending on their source.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings.

DETAILED DESCRIPTION

Examples of the present disclosure relate to systems and methods for the improved translation of conversations. The system may receive portions of a conversation from a first user device, translate the portions of the conversation from a first language and into a second language, predict the next portion of the conversation to generate a predicative translation, generate a batch translation, and identify any differences between the batch translation and predictive translation. The system may also generate a color-coded translation highlighting any differences between the batch translation and the predictive translation and send the color-coded translation to a second user device to cause the second user device to display the predictive translation, the batch translation, or both with any differences between the batch translation and the predictive translation highlighted. The system may also determine sentiments, confusion, and/or conversational nuances expressed during the conversation that are included as part of the color-coded translation in a respective second, third, or fourth color.

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
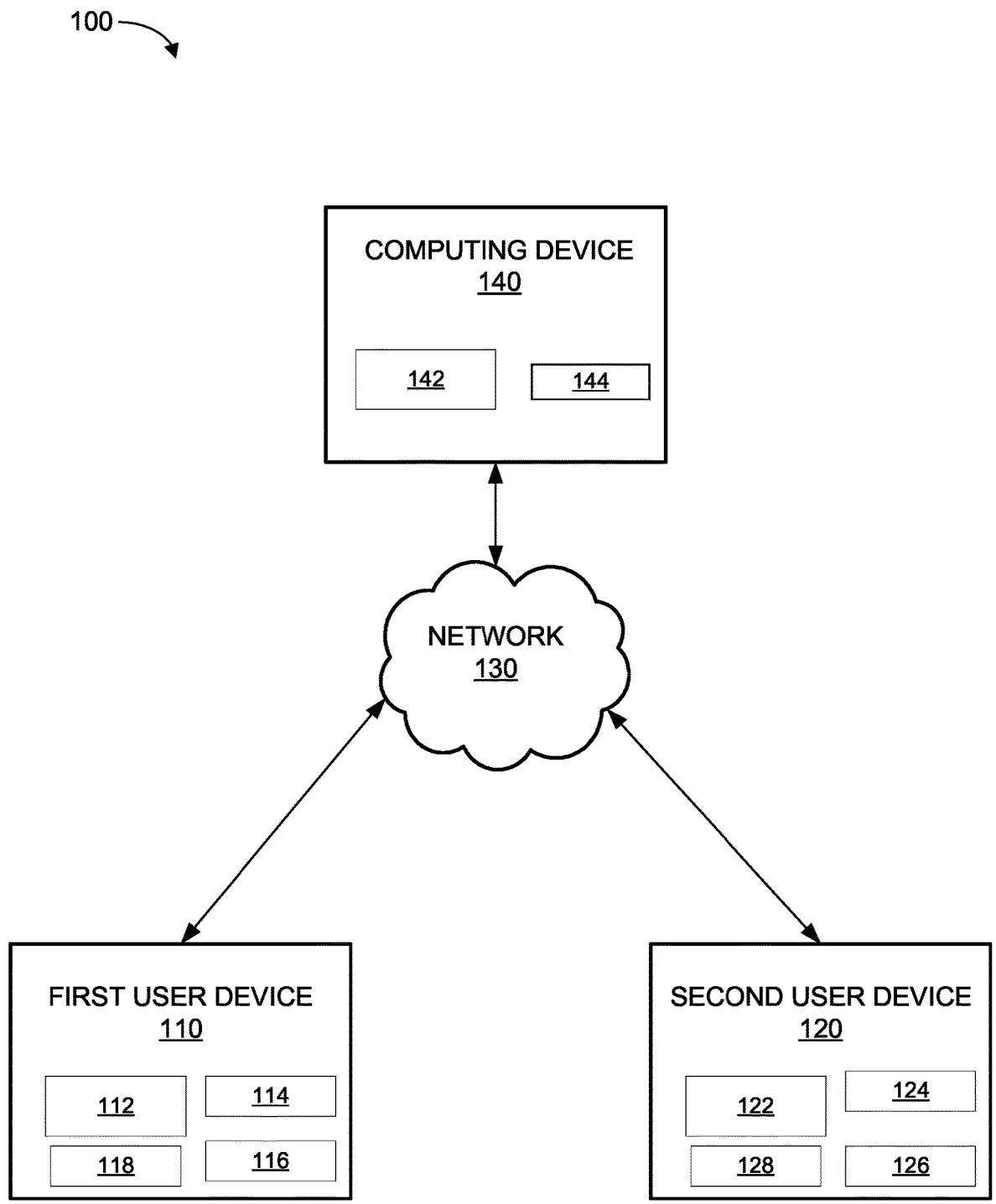
FIG. 1 is a diagram of an example system that may be used to implement one or more embodiments of the present disclosure.

FIG. 1 shows an example system 100 that may implement certain aspects of the present disclosure. As shown in FIG. 1, in some implementations the system 100 can include a first user device 110, a second user device 120, a network 130, and one or more computing devices 140, which may include a processor 142, and an application 144. The first user device 110 and the second user device 120 may include respective processors 112 and 122, respective first graphical user interfaces (GUI) 114 and 124, respective second GUIs 116 and 126, and respective applications 118 and 128. The second user device 120 may perform functions similar to the first user device 110 as described herein.

As non-limiting examples, the first user device 110 and the second user device 120 may be a personal computer, a smartphone, a laptop computer, a tablet, or other personal computing device. The network 130 may include a network of interconnected computing devices such as a local area network (LAN), Wi-Fi, Bluetooth, or other type of network and may be connected to an intranet or the Internet, among other things. The computing device 140 may include one or more physical or logical devices (e.g., servers) or drives and may be implemented as a single server, a bank of servers (e.g., in a "cloud"), run on a local machine, or run on a remote server. An example computer architecture that may be used to implement the first user device 110 and the second user device 120 is described below with reference to FIG. 2. An example computer architecture that may be used to implement the computing device 140 is described below with reference to FIG. 3.

Turning to the computing device 140, during a conversation between the users of the first user device 110 and the second user device 120, the first user device 110 may transmit a first portion of a conversation in a first language (e.g., English) to the computing device 140. The first portion of the conversation may be spoken by a user of the first user device 110—e.g., the user may speak into a microphone associated with the first user device 110. Of course, the microphone may be in communication with the processor 112, such that the processor 112 receives the audio phrase (or an electronic representation thereof) from the microphone. In other embodiments, the user may enter the portion of the conversation as a text input (e.g., using voice-to-text, a keypad, or touchscreen) through an application (e.g., application 118) running on the processor 112. Further, the application 118 may be associated with the first GUI 114 and/or the second GUI 116. Therefore, the first portion of the conversation entered by the user may appear as a visual representation in the first language on the first GUI 114 and/or the second GUI 116.

The first user device 110 may send the first portion of the conversation in the first language to the computing device 140 as an audio file (e.g., .wav file or .mp4 file) and/or as a text file (e.g., docx file or .txt file), among other things. The first user device 110 may also send device identification information of the first user device 110, separately or in tandem with the first portion of the conversation, to the computing device 140. The device identification information may include a username, phone number, e-mail address, social media handle, media access control (MAC) address, mobile device identification, subscriber identity module (SIM) data, and/or the like associated with a user device.

In some embodiments, the first user device 110 and the second user device 120 may be paired, for example, by Bluetooth® and/or NFC communication. In these embodiments, after the devices are paired, the first user device 110 may send device identification information of the first user device 110 and/or the second user device 120 to the computing device 140.

After receiving the first portion of the conversation from the first user device 110, the computing device 140 may execute a translation algorithm that translates the first portion of the conversation into a second language (e.g., French). The translation algorithm may be any translation algorithm known in the art capable of performing the features disclosed herein. Based on at least the first portion of the conversation, the computing device 140, executing a predictive algorithm, may generate a predicted second portion of the conversation in the second language. The predicted second portion of the conversation may also be based on other prior portions of the conversation, previous conversations between the users, and/or archived conversations from a plurality of users. The previous conversations may be stored within memory associated with the computing device 140. These prior portions of the conversation and previous conversations may provide additional context and/or more accurate predictions.

After generating the predicted second portion of the conversation, the computing device 140 may transmit the first portion and the predicted second portion of the conversation in the second language, as a first predictive translation, to the second user device 120. The first predictive translation may be transmitted as an audio file and/or as a text file. Therefore, the computing device 140 may translate the conversation from text to text, text to audio, audio to audio, and/or audio to text.

Next, computing device 140 may receive an actual second portion of the conversation in the first language from the first user device 110. Again, executing the translation algorithm, the computing device 140 may translate the actual second portion of the conversation to the second language. The translated first portion and actual second portion of the conversation may then be transmitted to the second user device 120 as a first batch translation.

Further, the computing device 140 may compare the batch translation to the predictive translation to identify any differences between the two translations. The computing device 140 may then generate a first color-coded translation that includes any differences between the first predictive translation and the first batch translation. Therefore, the first color-coded translation may include the first predictive translation and any differences between the first predictive translation and the first batch translation highlighted in a first color (e.g., yellow). The differences may include additional words and/or a different choice of words or expressions, for example, two words that are synonyms of one another may be highlighted. The computing device 140 may transmit the first color-coded translation to the second user device 120, which may cause the second user device 120 to display the first predictive translation with any differences between the first batch translation and the first predictive translation. The first color-coded translation may also include instructions, that when received by the second user device 120, cause the first color-coded translation to be displayed by a GUI (e.g., the first GUI 124).

The computing device 140 may also identify sentiments and/or conversational nuances that are part of the first color-coded translation. In some embodiments, the computing device 140 may identify one or more sentiments from the first color-coded translation based on tone, one or more questions, pitch, negative wording (e.g., "That's terrible!"), positive wording (e.g., "Thank you!"), and/or redundant wording. The computing device 140 may assign a second color code (e.g., purple) to each of the one or more sentiments in the first color-coded translation, and then update the first color-coded translation to include the second color code (e.g., purple). Conversational nuances, such as confusion, may also be identified by the computing device 140 based on a predetermined amount of time between utterances—e.g., long pauses between utterances may indicate confusion. A user uttering one or more questions during the conversation may also indicate confusion. Frequent repetition may additionally indicate confusion. Further, the translation algorithm may employ cultural norms in determining conversational nuances—e.g., silence may be indicative of confusion amongst speakers of Mandarin, for example, yet silence may be indicative of acceptance amongst English speakers. Conversational nuances may be pretrained by experts, for example, or can be learned through a feedback system where abruptly ended calls may indicate dissatisfaction. Overall, cultural norms can be learned by having inputs such as silences or repetition along with the actual word when training the model. The translation algorithm may utilize self-attention networks to assimilate similar terminology or norms based on likeness and/or interchangeability of usage. Therefore, with sufficient training, the translation algorithm may incorporate and/or learn the norms. As with the one or more sentiments, the computing device 140 may assign a third color code (e.g., red) to each of the conversational nuances in the first color-coded translation, and then update the first color-coded translation to include the third color code.

The color-coded translation can be displayed on the second user device 120 in a manner that enables the second user to easily decipher the conversation. The second user device 120 may display the predictive translation in the first GUI 124, for example, and the batch translation in the second GUI 126 on a split screen. See, FIG. 7 below. In some cases, differences between the predictive translation and the batch translation may be highlighted in a first color (e.g., red or yellow) in the first GUI 124, for example, while nuances or sentiments are highlighted in a second color (e.g., green or blue) in the second GUI 126. Of course, other configurations are possible.

In some examples, after receiving the first color-coded translation, a user of the second user device 120 may send a first response to the computing device 140. The first response may be the user's response to the accuracy of the difference(s), the sentiment(s), and/or the conversational nuance(s) as determined by the computing device 140. Indeed, the first response may indicate a correction, confirmation, or a denial of the difference(s), the sentiment(s), and/or the conversational nuance(s). The computing device 140 may update the first color-coded translation based on the first response. After receiving a first response indicating one of the sentiments is inaccurate, therefore, the computing device 140 may remove or change the second color code from the previously identified sentiment. Further, based on the first response, the computing device 140 may update the translation algorithm, improving the accuracy of the translation algorithm over time. Of course, in some examples, the translation, sentiments, and other features of the translation may be correct, obviating the need for the first response.

Next, a user of the second user device 120 may reply to the user of the first user device 110 by sending a third portion of the conversation in the second language to the computing device 140. The computing device 140 may translate the third portion of the conversation from the second language into the first language. Further, the computing device 140 may generate a predicted fourth portion of the conversation based on at least the third portion of the conversation using the predictive algorithm. The predicted fourth portion of the conversation may also be based on previous conversations and/or other portions of the conversation. The computing device 140 may send the third portion and the predicted fourth portion of the conversation translated into the first language, as the second predictive translation, to the first user device 110. The first user device 110 may display the second predictive translation on the first GUI 114, for example.

The second user device 120 may then send an actual fourth portion of the conversation in the second language to the computing device 140. The computing device 140 may translate the actual fourth portion of the conversation into the first language and send the third portion and the actual fourth portion of the conversation in the first language, as the second batch translation, to the first user device 110. The first user device 110 may display the second batch translation on the second GUI 116, for example.

After receiving the second predictive translation and the second batch translation, the computing device 140 may compare the second predictive translation and the second batch translation to identify any differences between the second predictive translation and the second batch translation. Similar to generating the first color-coded translation above, the computing device 140 may generate a second color-coded translation that includes any differences between the second predictive translation and the second batch translation. Further, the second color-coded translation may include sentiments, indications of confusion, and/or conversational nuances indicated in a respective color. The computing device 140 may then send the second color-coded translation to the first user device 110.

As before, any differences between the predictive translation and the batch translation, sentiments, nuances, or other features of the conversation may also be highlighted in the first GUI 114, the second GUI 116, or both. The first user device 110 may display any differences between translations in a color-coded format on, for example, the first GUI 114 in a first color (e.g., yellow) as part of the second predictive translation. The user of the first user device 110 may send a second response, similar to the first response, that indicates the accuracy of the color-codes, i.e., whether any highlighted differences or sentiments are accurate, to the computing device 140. Based on the second response, the computing device 140 may update the translation algorithm and/or the second color-coded translation.

In examples where the translations are received at the user devices 110 and 120 in an audio format, the differences may be included as a verbal portion indicating the differences, for example, the translation might interject, "Please note this portion may be also interpreted as 'John runs through the city' or as 'John is in charge of the city.'" In other examples, the tone or pitch of the audio translation may change when a difference exists between the translations. The tone or pitch of the audio translation may also change to comport with the perceived sentiment or nuance of the respective user—e.g., if the user sounds excited or happy, the pitch or tone of the audio translation may go up, and vice-versa.

It should be noted that in some embodiments, the first user device 110 and the second user device 120 may translate the conversation entered by a respective user and send portions of the conversation to the other user device, i.e., without involving the computing device 140. Therefore, in addition to the features disclosed above, the first user device 110 or the second user device 120 may, for example: translate the first portion of the conversation into the second language; generate the predicted second portion of the conversation in the second language; generate the first predictive translation in the second language; transmit the first predictive translation; translate the actual second portion of the conversation into the second language; generate the first batch translation; transmit the first batch translation; identity any differences between the first predictive translation and the first batch translation; generate the first color-coded translation based on any differences, determined sentiments, confusion, and/or conversation nuances; and transmit the first color-coded translation.

Figure 2:
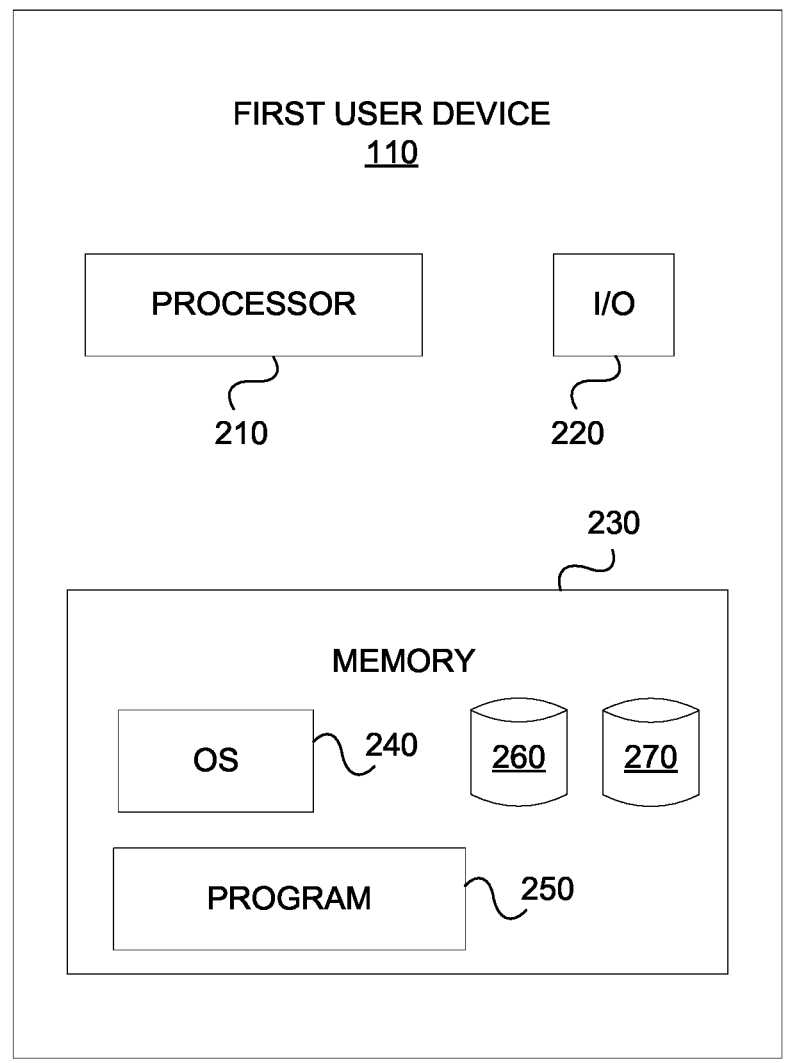
FIG. 2 is a component diagram of a user device, in accordance with some examples of the present disclosure.

An example embodiment of the first user device 110 is shown in more detail in FIG. 2. The second user device 120 may have a similar structure and components that are similar to those described with respect to the first user device 110. As shown, the first user device 110 may include a processor 210, an input/output ("I/O") device 220, a memory 230 containing an operating system ("OS") 240 and a program 250. In some examples, the first user device 110 may comprise, for example, a cell phone, a smart phone, a tablet computer, a laptop computer, a desktop computer, a sever, or other electronic device. The first user device 110 may be a single server, for example, or may be configured as a distributed, or "cloud," computer system including multiple servers or computers that interoperate to perform one or more of the processes and functionalities associated with the disclosed embodiments. In some embodiments, the first user device 110 may further include a peripheral interface, a transceiver, a mobile network interface in communication with processor 210, a bus configured to facilitate communication between the various components of the first user device 110, and a power source configured to power one or more components of the first user device 110.

A peripheral interface may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. The transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, the first user device 110 may be configured to remotely communicate with one or more other devices, such as the computing device 140, and/or the second user device 120. According to some embodiments, the first user device 110 may utilize the translation algorithm (or other suitable logic) to translate the conversation.

The processor 210 may include one or more of a microprocessor, a microcontroller, a digital signal processor, a co-processor or the like or combinations thereof capable of executing stored instructions and operating upon stored data. The memory 230 may include, in some implementations, one or more suitable types of memory (e.g. such as volatile or non-volatile memory, a random access memory (RAM), a read only memory (ROM), a programmable read-only memory (PROM), an erasable programmable read-only memory (EPROM), an electrically erasable programmable read-only memory (EEPROM), one or more magnetic disks, one or more optical disks, one or more floppy disks, one or more hard disks, one or more removable cartridges, a flash memory, a redundant array of independent disks (RAID), and the like), for storing files including an operating system, one or more application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. The processor 210 may be a single core processor, for example, that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The first user device 110 may include one or more storage devices configured to store information used by the processor 210 (or other components) to perform certain functions related to the disclosed embodiments. In one example, the first user device 110 may include the memory 230 that includes instructions to enable the processor 210 to execute one or more applications (e.g., application 118), such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the first user device 110 may include the memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. The first user device 110 may include the memory 230 including one or more programs 250, for example, to perform one or more functions of the disclosed embodiments. Moreover, the processor 210 may execute the one or more programs 250 located remotely from the first user device 110. For example, the first user device 110 may access the one or more remote programs 250, that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. The memory 230 may include software components that, when executed by the processor 210, perform one or more processes consistent with the disclosed embodiments. In some embodiments, the memory 230 may include an image processing database 260 and a neural-network pipeline database 270 for storing related data to enable the first user device 110 to perform one or more of the processes and functionalities associated with the disclosed embodiments.

The first user device 110 may also be communicatively connected to one or more memory devices (e.g., databases (not shown)) locally or through a network. The remote memory devices may be configured to store information and may be accessed and/or managed by the first user device 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

The first user device 110 may also include the one or more I/O devices 220 that may include one or more interfaces (e.g., transceivers) for receiving signals or input from devices and providing signals or output to one or more devices that allow data to be received and/or transmitted by the first user device 110. The first user device 110 may include interface components, for example, which may provide interfaces to one or more input devices, such as one or more keyboards, mouse devices, touch screens, track pads, trackballs, scroll wheels, digital cameras, microphones, sensors, and the like, that enable the first user device 110 to receive data from one or more users (such as via second user device 120).

In example embodiments of the disclosed technology, the first user device 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the first user device 110 has been described as one form for implementing the techniques described herein, those having ordinary skill in the art will appreciate that other, functionally equivalent techniques may be employed. As is known in the art, some or all of the functionality implemented via executable instructions may also be implemented using firmware and/or hardware devices such as, for example, application specific integrated circuits (ASICs), programmable logic arrays, state machines, etc. Furthermore, other implementations of the first user device 110 may include a greater or lesser number of components than those illustrated.

Figure 3:
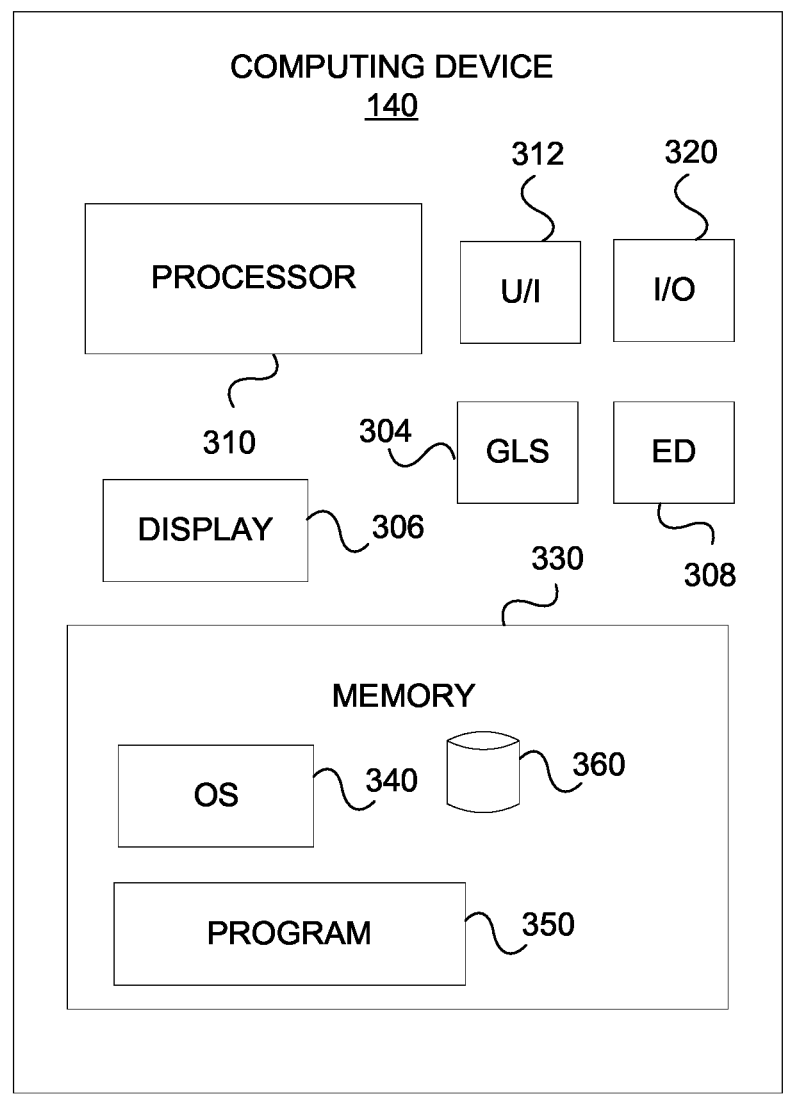
FIG. 3 is a component diagram of a computing device, in accordance with some examples of the present disclosure.

FIG. 3 shows an example embodiment of the computing device 140. As shown, the computing device 140 may include an input/output ("I/O") device 320 for receiving data from another device (e.g., the first user device 110 and/or the second user device 120), a memory 330 containing an operating system ("OS") 340, a program 350, and any other associated components. The computing device 140 may also have the one or more processors 310, geographic location sensor ("GLS") 304 for determining the geographic location of computing device 140, a display 306 for displaying content such as text messages, images, and selectable buttons/icons/links, an environmental data ("ED") sensor 308 for obtaining environmental data including audio and/or visual information, and a user interface ("U/I") device 312 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 312 may include some or all of the components described with respect to I/O device 320 above. In some embodiments, environmental data sensor 308 may include a microphone and/or an image capture device, such as a digital camera.

Figure 4:
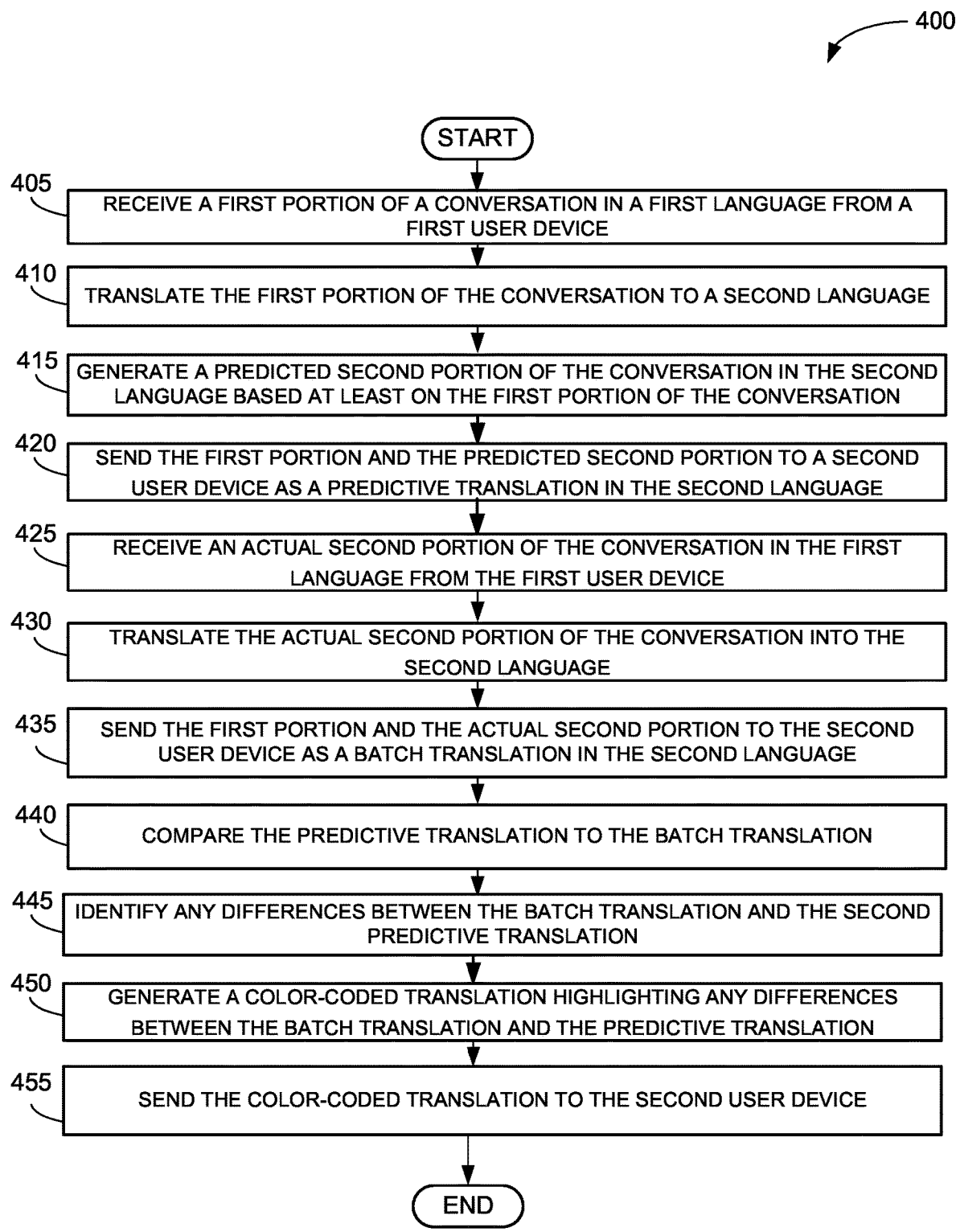
FIG. 4 is a flowchart of a method for improved conversation translation from the perspective of a computing device, in accordance with some examples of the present disclosure.

FIG. 4 is a flowchart of an example of a method 400 for improved conversation translation from the perspective of the computing device 140. Method 400 may be performed by the computing device 140, the first user device 110, the second user device 120, or any combination thereof. The computing device 140 may be in communication with the first user device 110 and the second user device 120. Further, the computing device 140 may receive portions of the conversation from first user device 110, translate the portions of the conversation, transmit the translated portions to the second user device 120, and vice-versa.

At 405, the computing device 140 may receive the first portion of the conversation in the first language (e.g., English). The first portion of the conversation may be in a text format, an audio format, or any other suitable format. The computing device 140 may receive the first portion of the conversation, for example, from the first user device 110. According to some embodiments, the computing device 140 may also receive device information for the first user device 110 and/or the second user device 120, which the computing device 140 may use as to address and send the translated portions of the conversation back-and-forth. In some embodiments, the computing device 140 may also information from the first user device 110 that provides the second language into which the conversation is to be translated. At 410, the computing device 140 may translate the first portion of the conversation into the second language (e.g., French). To perform the translation, the computing device 140 may execute the translation algorithm. At 415, the computing device 140 may generate the predicted second portion of the conversation in the second language using the predictive algorithm. The predicted second portion may be based on previous conversations, for example, and/or the first portion of the conversation.

At 420, the computing device 140 may send the first portion and the predicted second portion of the conversation in the second language as the predictive translation to the second user device 120. At 425, the computing device 140 may receive the actual second portion of the conversation in the first language from the first user device 110. At 430, using the translation algorithm, the computing device 140 may translate the actual second portion of the conversation from the first language into the second language. At 435, the computing device 140 may send the translated first portion and actual second portion of the conversation to the second user device 120 as the first batch translation.

At 440, the computing device 140 may compare the predictive translation to the batch translation. Further, at 445, the computing device 140 may identify any differences between the predictive translation and the batch translation. The differences may include additional words and/or a different choice of words (e.g., synonyms) or expressions, among other things. At 450, the computing device 140 may generate a color-coded translation highlighting the differences between the batch translation and the predictive translation in a first color code (e.g., yellow). In some embodiments, the computing device 140 may also identify the sentiment(s), conversational nuance(s), colloquial terms, and other features of the conversation and include them as part of the color-coded translation. The sentiment(s) may be included as the second color code (e.g., purple), for example, while the conversational nuance(s) may be included as the third color code (e.g., red). At 455, the computing device 140 may transmit the color-coded translation to the second user device 120. In some embodiments, the color-coded translation may include instructions that when executed, cause the second user device 120 to display the color-coded translation on the first GUI 124 associated with the second user device 120.

Figure 5:
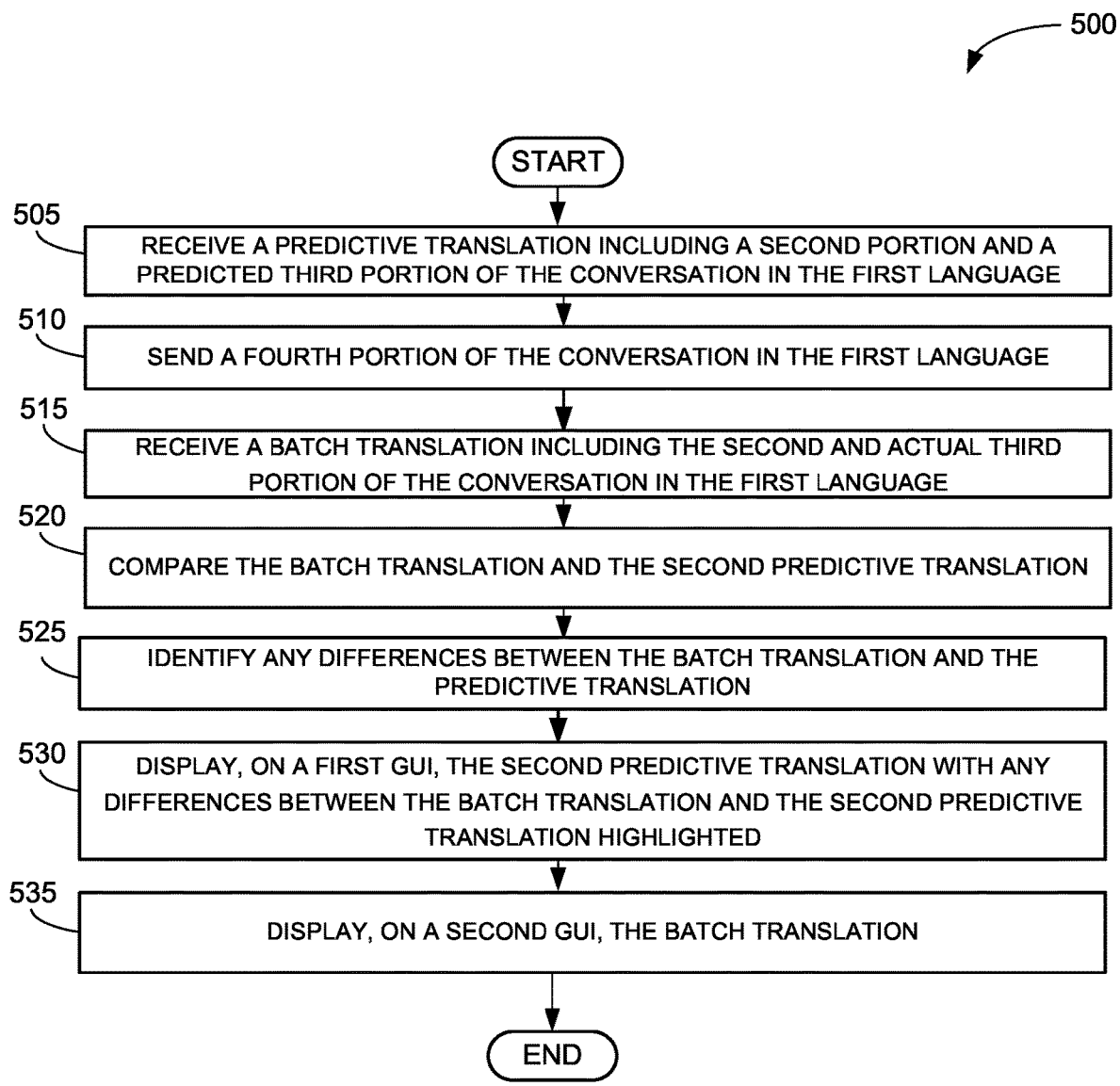
FIG. 5 is another flowchart of a method for improved conversation translation from the perspective of a user device, in accordance with some examples of the present disclosure.

FIG. 5 depicts a flowchart of a method 500 for improved conversation translation from the perspective of the first user device 110. A first user communicates, via the first user device 110, with the computing device 140 to conduct a conversation in the first language with a second user in the second language using the second user device 120. In this example, the comparison of the batch translation and the predictive translation can be carried out on the first user device 110, as opposed to the computing device 140 (as discussed above). In this case, the first user has sent a first portion of the conversation to the computing device 140 and the computing device 140 has translated the first portion and sent it to the second user device 120. Thus, the example begins as the first user device 110 receives the response from the second user device 120 (via the computing device 140).

At 505, the first user device 110 may receive a predictive translation in the first language from the computing device 140. The predictive translation may include the second portion of the conversation (e.g., the initial part of the response from the second user device 120) and a third predicted portion of the conversation. In some embodiments, the second user device 120 may send the second portion of the conversation in the second language to the computing device 140. In response, the computing device 140 may generate the third predicted portion in the first language. According to some embodiments, the computing device 140 may then send the predictive translation including the second portion and the third predicted portion to the first user device 110.

At 510, the first user device 110 may send the fourth portion of the conversation in the first language to the computing device 140. The fourth portion of the conversation may be the first user's response to the predictive translation. At 515, the first user device 110 may then receive the batch translation from the computing device 140. The batch translation may include the second portion and the actual third portion of the conversation as received from the second user device 120 and translated from the second language to the first language. The computing device 140 may translate the second portion and the actual third portion of the conversation into the first language and send them together as the batch translation to the first user device 110.

At 520, the first user device 110 may compare the predictive translation to the batch translation. Further, at 525, the first user device 110 may identify any differences between the batch translation and the predictive translation. At 530, the first user device 110 may display on the first GUI 114 the predictive translation with any differences between the batch translation and the predictive translation highlighted in the first color (e.g., yellow). Additionally, at 535, the first user device 110 may display the batch translation on the second GUI 116. After displaying the two translations to the first user, the first user may, in some embodiments, enter a first response indicating the accuracy of the color highlights.

Figure 6:
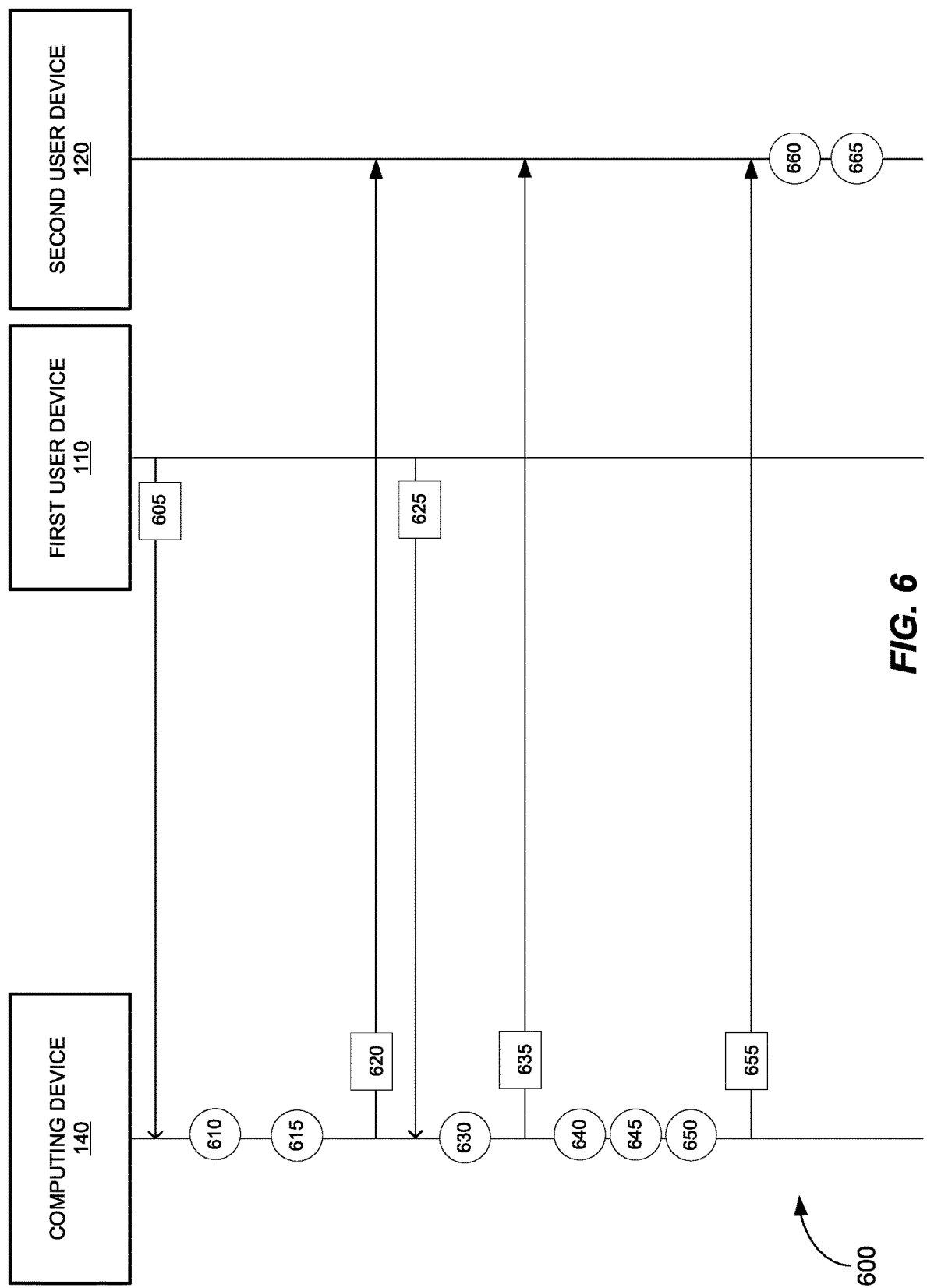
FIG. 6 is a timing diagram of a method for improved conversation translation, in accordance with some examples of the present disclosure.

FIG. 6 illustrates a timing diagram of a method 600 for improved conversation translation. The timing diagram represents the perspective of the computing device 140 in communication with the first user device 110 and the second user device 120. Similar to FIG. 4, the computing device 140 may translate portions of the conversation received from the first user device 110 and transmit the portions to the second user device 120.

At 605, the first user device 110 may transmit the first portion of the conversation in the first language (e.g., English) to the computing device 140. In some embodiments, the first user device 110 may transmit a language request that includes the second language (e.g., French) to translate portions of the conversation received from the first user device 110. The language request may be sent separately or with the first portion of the conversation. At 610, the computing device 140, executing the translation algorithm, may translate the first portion of the conversation to the second language. At 615, the computing device 140 may generate the predicted second portion of the conversation in the second language. To predict the second portion of the conversation, the computing device 140 may use the predictive algorithm and, for example, the first portion of the conversation and/or previous conversations, among other things.

At 620, the computing device 140 may send the predictive translation in the second language to the second user device 120. The predictive translation may include the first portion and the predicted second of the conversation. At 625, the computing device 140 may receive the actual second portion of the conversation in the first language from the first user device 110.

The computing device 140, at 630, may generate the batch translation, which includes the first portion and the actual second portion of the conversation in the second language. At 635, the computing device 140 may transmit the batch translation to the second user device 120. In some embodiments, the computing device 140 may receive device information of the second user device 120 from the first user device 110. Using the device information, the computing device 140 may determine where to send the batch translation (e.g., an address associated with the second user device 120). At 640, the computing device 140 may compare the batch translation to the predictive translation. Further, at 645, the computing device 140 identify any differences between the batch translation and the predictive translation.

At 650, the computing device 140 may generate a color-coded translation based on the predictive translation, the batch translation, and/or any identified differences. The color-coded translation may include the differences highlighted in a first color. At 655, the computing device 140 may send the color-coded translation to the second user device 120. In some embodiments, the color-coded translation may include instructions that cause the first GUI 124 associated with the second user device 120 to display the color-coded translation. At 660, the second user device 120 may display on the first GUI 124 the color-coded translation. Furthermore, at 665, the second user device 120 may display on the second GUI 126 the batch translation. As mentioned above, by displaying the two translations to the user of the second user device 120, the user may enter an input indicating the accuracy of the highlighted differences.

Figure 7:
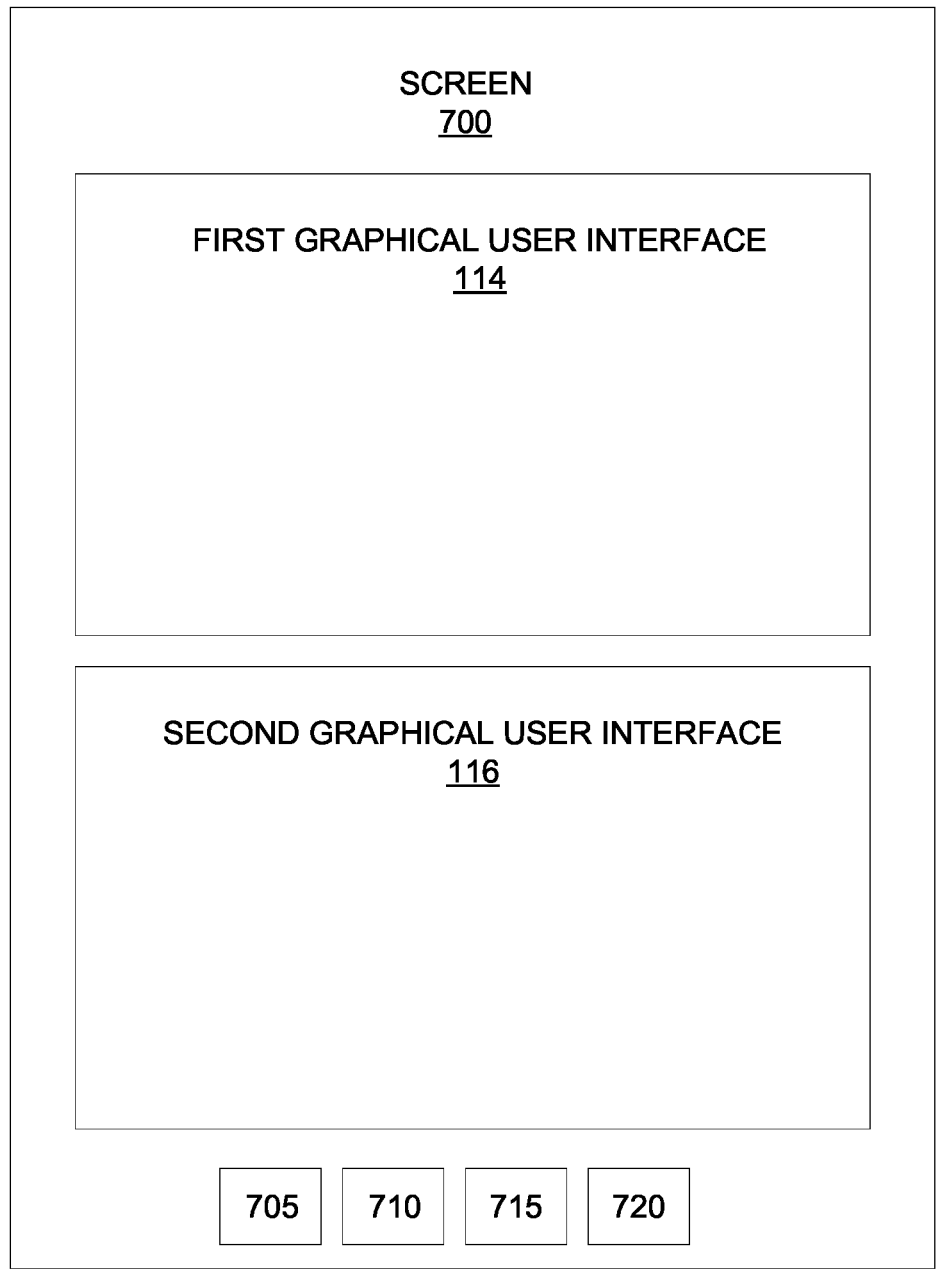
FIG. 7 is a screen of a user device with multiple GUIs (GUIs), in accordance with some examples of the present disclosure.

FIG. 7 depicts an example of a screen 700 that includes the first GUI 114 and the second GUI 116 for use with the system 100, user devices 110 and 120, and methods 400 and 500 disclosed herein. The screen 700 may be included as part of, for example, the first user device 110, for example, or the second user device 120. In additions to the GUIs 114 and 116, the screen 700 may also include a plurality of buttons 705, 710, 715, and 720. The buttons may be visual representations of certain keys on a keyboard and/or may be specific functions, for example, button 705 may be a "confirm button," button 710 may be a "denial button," button 715 may be an "insert button," and button 720 may be a "select button."

As mentioned above, the first GUI 114 may display the predictive translation, which may include indications of sentiments, confusion, differences, and/or conversation nuances in respective color codes. Further, the second GUI 116 may display the batch translation. The user may observe differences between the predictive translation and the batch translation as color-coded highlights within the first GUI 114 and/or the second GUI 116. The user may select, with button 720, the highlighted portion of the conversation, for example, and then confirm with button 705 that the predictive translation is correct. Alternately, after selecting the highlighted portion of the conversation, the user may deny that the predictive translation is correct with button 710. Further, the user may select the highlighted portion of the conversation with button 720, for example, and then choose to insert a term or a phrase in place of the highlighted portion with button 705. The confirmation, denial, or the insertion of a term or phrase may be the first response or the second response.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a typical use of the systems and methods described herein for improved conversation translation. It is intended solely for explanatory purposes and not for limitation. In one example, an American tourist, Fred, who is visiting Paris, wishes to communicate with a French grocer, Jean. Neither Fred nor Jean are able to speak the other's language. Luckily, both Fred and Jean have a translation application (e.g., application 118 and application 128) installed on their respective smartphones (e.g., first user device 110 and second user device 120), which may also include the predictive algorithm. Jean and Fred tap their smartphones, which facilitates communication of the applications.

From within the applications, Fred selects an option to translate his words from English to French. When Fred speaks into his smartphone, the smartphone sends the words spoken by Fred to a server (e.g., computing device 140) which translates the words into French and also includes the next words likely to be spoken by Fred (e.g., the first predictive translation). Next, Jean receives a display of the translation on his smartphone. As Fred continues speaking, his words are further sent to the server and translated. The server then sends the literal translation (e.g., the batch translation) to Jean's smartphone. Jean may then receive another translation in a color-coded format where the colors represent any differences between the two translations.

Now, when Jean responds to Fred by speaking into his smartphone, his smartphone sends his words to the server. The server then translates Jean's words and predicts the next words. The server then sends the translation including the predicted next words to Fred's phone. As Jean continues speaking, his smartphone continually transmits his words to the server. Ultimately, Jean's words are literally translated and sent to Fred. Similar to Fred, Jean receives another translation in a color-coded format with any differences highlighted in yellow. Jean and Fred continue this exchange until the conversation is over. At this point, Jean and Fred decide to rate the accuracy of the translation by sending a response to each of the highlighted differences to the server. The server then applies the responses from Jean and Fred to improve the translation application.

The predictive translations may enable Fred and Jean to communicate in a more natural and efficient manner. In other words, the delay associated with the batch translations is reduced by the predictive translations. During the conversation, if no yellow highlighting appears in the predictive translational during the conversation, for example, then the system has correctly predicted all of the conversation. In this case, Fred and Jean need not consult the batch translation, thus improving the efficiency of their communications. If, on the other hand, there are differences, Fred and Jean can easily look to the second GUI for the corrected batch translation and make any necessary adjustments. Indeed, in some cases, the differences may be inconsequential (e.g., the differences are actually synonyms), which can also improve their communication.

What is claimed is:

1. A method for improved conversation translation comprising:
   receiving, by a processor, a first portion of a conversation in a first language from a first user device associated with a first user;
   translating, by the processor, the first portion of the conversation from the first language to a second language with a translation algorithm;
   generating, by the processor, a predicted second portion of the conversation in the second language with a predictive algorithm;
   generating, by the processor, a predictive translation in the second language comprising the first portion and the predicted second portion in the second language;
   receiving, at the processor, an actual second portion of the conversation from the first user device in the first language;
   translating, by the processor, the actual second portion of the conversation from the first language to the second language with the translation algorithm;
   generating, by the processor, a batch translation comprising the first portion and the actual second portion of the conversation in the second language; sending, by the processor, the predictive translation to a second user device to cause the second user device to display the predictive translation on a screen of the second user device as a first graphical user interface; and
   sending, by the processor, the batch translation to the second user device to cause the second user device to display the batch translation on the screen of the second user device as a second graphical user interface.

2. The method of claim 1, further comprising:
   comparing, by the processor, the predictive translation to the batch translation to identify differences between the predictive translation and the batch translation.

3. The method of claim 2, further comprising:
   generating, by the processor, a color-coded translation to highlight the differences between the batch translation and the predictive translation in a first color; and
   sending, by the processor, the color-coded translation to the second user device to cause the second user device to display the predictive translation with any differences between the batch translation and the predictive translation highlighted on the screen of the second user device as the first graphical user interface.

4. The method of claim 3, further comprising:
   identifying, by the processor, one or more sentiments from the conversation; and
   updating, by the processor, the color-coded translation to include the one or more sentiments as a second color.

5. The method of claim 4, wherein identifying the one or more sentiments from the conversation comprises:
   comparing, by the processor, each portion of the color-coded translation to a set of keywords to determine at least one match, the set of keywords comprising a plurality of negative words and a plurality of positive words; and
   setting, by the processor, the at least one match of the color-coded translation as a sentiment of the one or more sentiments.

6. The method of claim 4, wherein identifying the one or more sentiments from the conversation comprises:
   determining, by the processor, a pitch level for each portion of the conversation based on predetermined pitch settings;
   comparing the pitch level for each portion of the conversation to an average pitch of the predetermined pitch settings to identify at least one portion of the conversation above or below the average pitch; and
   setting, by the processor, a portion of the color-coded translation corresponding to the at least one portion of the conversation as a sentiment of the one or more sentiments.

7. The method of claim 4, wherein identifying the one or more sentiments from conversation comprises:
   determining, by the processor, that at least one portion of the color-coded translation is a question; and
   setting, by the processor, the question as a sentiment of the one or more sentiments.

8. The method of claim 1, wherein the identifying the one or more conversational nuances from the conversation comprises:
   determining, by the processor, an amount of time between each portion of the conversation;
   determining, by the processor, that the amount of time between two consecutive portions of the conversation exceeds a predetermined amount of time; and
   setting, by the processor, at least one of the two consecutive portions as a first conversational nuance of the one or more conversational nuances.

9. A method for improved conversation translation comprising:
   receiving, by a processor, a first portion of a conversation in a first language from a first user device associated with a first user;
   translating, by the processor, the first portion of the conversation from the first language to a second language with a translation algorithm;
   generating, by the processor, a predicted second portion of the conversation in the second language with a predictive algorithm;
   generating, by the processor, a predictive translation in the second language comprising the first portion and the predicted second portion in the second language;
   sending, by the processor, the predictive translation to a second user device to cause the second user device to display the predictive translation on a screen of the second user device as a first graphical user interface;

identifying, by the processor, one or more sentiments from the conversation; and
generating and sending to the second user device, by the processor, a color-coded translation to include the one or more sentiments as a first color.

10. The method of claim 9, further comprising:
comparing, by the processor, the predictive translation to the batch translation to identify differences between the predictive translation and the batch translation.

11. The method of claim 10, further comprising:
generating, by the processor, a color-coded translation to highlight the differences between the batch translation and the predictive translation in a second color; and
sending, by the processor, the color-coded translation to the second user device to cause the second user device to display the predictive translation with any differences between the batch translation and the predictive translation highlighted on the screen of the second user device as the first graphical user interface.

12. The method of claim 1, wherein identifying the one or more sentiments from the conversation comprises:
comparing, by the processor, each portion of the color-coded translation to a set of keywords to determine at least one match, the set of keywords comprising a plurality of negative words and a plurality of positive words; and
setting, by the processor, the at least one match of the color-coded translation as a sentiment of the one or more sentiments.

13. The method of claim 9, wherein identifying the one or more sentiments from the conversation comprises:
determining, by the processor, a pitch level for each portion of the conversation based on predetermined pitch settings;
comparing the pitch level for each portion of the conversation to an average pitch of the predetermined pitch settings to identify at least one portion of the conversation above or below the average pitch; and
setting, by the processor, a portion of the color-coded translation corresponding to the at least one portion of the conversation as a sentiment of the one or more sentiments.

14. The method of claim 9, wherein identifying the one or more sentiments from conversation comprises:
determining, by the processor, that at least one portion of the color-coded translation is a question; and
setting, by the processor, the question as a sentiment of the one or more sentiments.

15. The method of claim 9, wherein the identifying the one or more conversational nuances from the conversation comprises:
determining, by the processor, an amount of time between each portion of the conversation;
determining, by the processor, that the amount of time between two consecutive portions of the conversation exceeds a predetermined amount of time; and
setting, by the processor, at least one of the two consecutive portions as a first conversational nuance of the one or more conversational nuances.

16. A system comprising:
one or more processors; and
memory, in communication with the one or more processor and storing instructions that, when executed, cause the one or more processors to:
receive a first portion of a conversation in a first language from a user of the first user device;
translate the first portion of the conversation from the first language to a second language with a translation algorithm;
generate a predicted second portion of the conversation in the second language with the predictive algorithm;
send a predictive audio translation, including the first portion and the predicted second portion, in the second language to a second user device;
receive an actual second portion of the conversation in a first language from the user of the first user device;
translate the actual second portion of the conversation from the first language to the second language with the translation algorithm;
send a batch audio translation including the first portion and the actual second portion in the second language to the second user device;
compare the predictive audio translation to the batch audio translation to identify any differences between the predictive audio translation and the batch audio translation;
generate a first audio user prompt, wherein the first audio user prompt indicates any differences between the batch audio translation and the predictive audio translation; and
send the first audio user prompt to the second user device to cause the second user device to output the first audio user prompt.

17. The first user device of claim 16, wherein the instructions when executed, further cause the first user device to:
receive, by the processor, a predictive translation from the second user device, the predictive translation in the first language and including a third portion of the conversation and a fourth predicted portion of the conversation, wherein the second user device receives the third portion in the second language from a user of the second user device;
output the predictive translation in the first language;
receive, by the processor, a batch translation in the first language including the third portion of the conversation and an actual fourth portion of the conversation, wherein the second user device receives the actual fourth portion in the second language from the user of the second user device; and
compare, by the processor, the predictive translation to the batch translation to identify any differences between the predictive translation and the batch translation.

18. The first user device of claim 17, wherein:
the predictive translation is in a text format;
the batch translation is in a text format; and
outputting the predictive translation comprises displaying, in the first GUI, the predictive translation in the first language, and the instructions, when executed, further cause the first user device to:
display, in the second GUI, the batch translation; and
highlight, in the first GUI, the second GUI, or both, any differences between the predictive translation and the batch translation in a first color.

19. The first user device of claim 17, wherein:
the predictive translation is in an audio format; and
the batch translation is in an audio format;
outputting the predictive translation comprises playing the predictive translation in the first language, and the instructions, when executed further cause the first user device to:
generate, by the processor, a second audio user prompt, wherein the second audio user prompt indicates any differences between the batch translation and the predictive translation; and play the second audio user prompt.

20. The first user device of claim 16, wherein the instructions when executed, further cause the first user device to:

pair, with the first application, the first user device to the second user device, wherein a second application of the second user device pairs with the first application.

* * * * *